United States Patent [19]

Slabinski

[11] 4,303,896

[45] Dec. 1, 1981

[54] WIDE RANGE DATA CABLE EQUALIZER

[75] Inventor: Chet J. Slabinski, Chagrin Falls, Ohio

[73] Assignee: The Babcock & Wilcox Company, New Orleans, La.

[21] Appl. No.: 151,858

[22] Filed: May 21, 1980

[51] Int. Cl.³ .......................... H03H 7/03; H03H 7/32
[52] U.S. Cl. .............................. 333/28 R; 178/63 E; 375/11; 375/36
[58] Field of Search ................ 333/28 R, 138, 139; 375/11, 36; 178/63 R, 63 C, 63 E

[56] References Cited

U.S. PATENT DOCUMENTS 2,379,744  7/1945  Pfleger ..................... 333/28 R X
3,135,932  6/1964  Bangert ....................... 333/138

*Primary Examiner*—Paul L. Gensler
*Attorney, Agent, or Firm*—James A. Hudak; Vytas R. Matas; Robert J. Edwards

[57] ABSTRACT

An equalizer circuit arrangement is provided for use without readjustment for a wide range of transmission line lengths. The circuit (10) is comprised of a resistor (20) and a capacitor (22) which introduce an additional time constant delay into the transmission system in order to reduce the percentage change of the transmission line response time for the shortest line used as compared to the longest line employed. This reduction permits one equalizer to be designed and used for the complete range of transmission line lengths involved.

2 Claims, 1 Drawing Figure

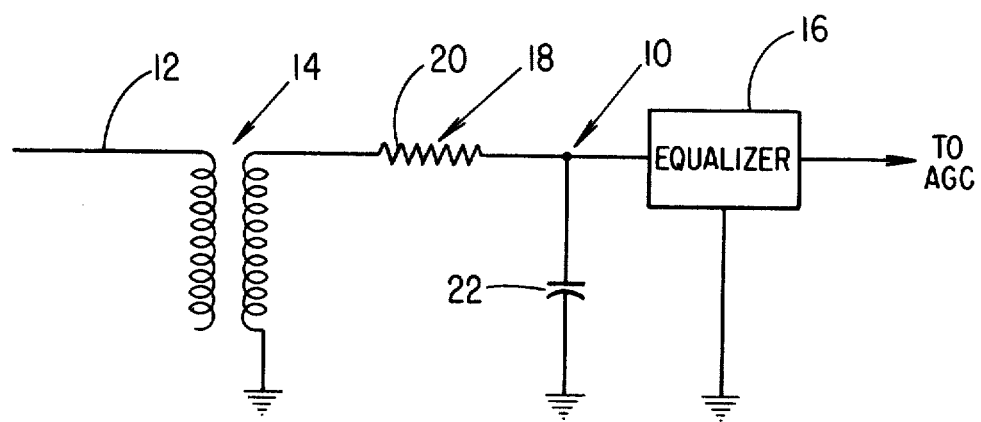

WIDE RANGE DATA CABLE EQUALIZER

TECHNICAL FIELD

The present invention relates generally to an equalizer arrangement that can be used for communication and data transmission systems, and more particularly to an equalizer arrangement that can be used without readjustment for a wide range of transmission line lengths.

BACKGROUND ART

Communication and data transmission systems utilizing transmission lines of various lengths have inherent problems. For example, a long transmission line can cause pulse distortion and/or intersymbol interference between data bits which will result in an erroneous signal transmission. Such a condition is typically corrected by the use of an equalizer to restore the signals or pulses transmitted, however, the use of such a device requires matching the frequency characteristics of the device with the frequency characteristics of a specific length of transmission line employed. If a wide range of cable lengths is involved, such as from 0 to 5000 feet, the cable response time can vary from a subnanosecond to 1.5 microseconds and the equalizer must be adjusted to match each different length of transmission line. Alternatively, a plurality of equalizers, each designed for a different range of transmission line lengths, can be provided and selectively switched into the system to accomplish this matching. Another approach utilized by the prior art is the use of delay lines to "build-out" short transmission lines to a range of cable lengths for matching with an equalizer adjusted to this range of cable lengths. All of these approaches involve additional expensive components and/or are time-consuming and cumbersome to effect.

Because of this, it has become desirable to develop a circuit arrangement that can be used to match a wide range of transmission line lengths with an equalizer so that re-adjustment of the equalizer is not necessary for each length of transmission line employed or for each sudden change in transmission line length which can occur in multistation communication systems.

SUMMARY OF THE INVENTION

The present invention solves the aforementioned problems associated with the prior art as well as other problems by introducing an additional time delay of approximately 1 microsecond into the system so that the effective response time of the transmission lines typically used, i.e., lines having lengths of from 0 to 5000 feet, will be 1 to 3 microseconds. In this manner, the percentage change of response time for this range of lengths is approximately 200 percent which is substantially less than the percentage change of response time, i.e., subnanosecond to 1.5 microseconds, prior to the introduction of this time delay. Because of this substantial reduction in the percentage change in response time, only one equalizer is necessary and it can be designed for the entire range of transmission line lengths.

The invention of this disclosure utilizes a resistance-capacitance circuit positioned between the secondary side of an input transformer and the equalizer and chosen to give the proper time delay for the range of transmission line lengths involved. Ideally, these components are chosen to give the aforementioned response time range of from approximately 1 to 3 microseconds for transmission line lengths of from 0 to 5000 feet, respectively, however, other response time ranges may be desirable depending upon the range of transmission line lengths involved.

In view of the foregoing, it will be seen that one aspect of the present invention is to provide an equalizer apparatus which can effectively equalize a wide range of transmission line lengths.

Another aspect of the present invention is to provide an equalizer arrangement which requires only one equalizer to equalize a wide range of transmission line lengths and which does not require adjustment thereof for each transmission line length utilized.

Yet another aspect of the present invention is to provide an equalizer apparatus which does not require switching means and/or a plurality of equalizers to match the frequency characteristics of the transmission lines with the frequency characteristics of the equalizer.

These and other aspects of the present invention will be more clearly understood after a review of the following description of the preferred embodiment when considered with the drawing.

BRIEF DESCRIPTION OF THE DRAWING

The FIGURE is an electrical schematic diagram of the invention of the disclosure.

DESCRIPTION OF THE PREFERRED EMBODIMENT

Referring now to the drawing where the illustration is for the purpose of describing the preferred embodiment of the invention and is not intended to limit the invention hereto, FIG. 1 shows a schematic diagram of a typical circuit 10 utilizing the invention of the disclosure. In FIG. 1, a data bit is generated and transmitted over a transmission line 12 to the primary winding of an input transformer 14, which is optional, and whose secondary winding is connected through a resistor 20, hereinafter described, to an equalizer, shown generally by the numeral 16. The output of the equalizer 16 is connected to an automatic gain control amplifier (AGC) for further processing of the signal. Interposed between the secondary winding of the input transformer 14 and the equalizer 16 is a resistance-capacitance circuit 18 comprised of the resistor 20 and a capacitor 22, and connected as illustrated. The resistance-capacitance circuit 18 introduces an additional time constant delay into the transmission circuit, as hereinafter described, so that the equalizer 16 does not require readjustment in order to accommodate different lengths of transmission line 12.

The concept underlying the operation of the circuit 10 is the introduction of the aforementioned additional time constant delay into the transmission circuit in order to reduce the percentage change of transmission line response time for the shortest line used as compared to the longest line employed. In the transmission system under consideration, transmission line lengths can vary between 0 to 5000 feet. The response time for such lengths of transmission lines can vary from a subnanosecond to 1.5 microseconds, and an equalizer having a frequency characteristic opposite to the characteristics of the specific transmission line length employed is generally required. The problem with this situation is that the range of transmission line response times (subnanosecond to 1.5 microseconds) is too wide to be handled by an equalizer without re-adjusting same. In essence, the percentage change of response time (subnanosecond to 1.5 microseconds) is too large to be effectively handled by a single equalizer without re-adjustment of same.

The invention of this disclosure effectively reduces the percentage change of this response time range by adding a time constant delay of approximately 1 microsecond to the transmission system which results in short transmission lines having a response time of approximately 1 microsecond and long transmission lines having a response time of approximately 2 to 3 microseconds. The end result is that any length of transmission line from 0 to 5000 feet will have a response time within a range of from 1 to 3 microseconds or 200 percent of the shortest response time (1 microsecond), and a single equalizer can be designed to give satisfactory results for this entire range. In the invention of this disclosure, the resistor 20 and the capacitor 22 can be chosen to obtain the desired response time range depending upon the lengths of transmission lines involved. It should be noted that in the foregoing, a transmission line having a length of 0 to 5000 feet was considered, however, other ranges of lengths can be utilized with similar results.

Certain modifications and improvements will occur to those skilled in the art upon reading the foregoing description. It will be understood that all such improvements and modifications have been deleted herein for the sake of conciseness and readability but are properly within the scope of the following claims.

I claim:

1. A preset equalizing circuit for data bit transmission lines having a wide range of response times substantially between a subnanosecond and 1.5 microseconds comprising:

a fixed delay device series-connected to the data bit transmission lines to provide a delay close to the high end of the range of response of said transmission lines to convert the range of transmission line response to the range substantially between 1 and 3 microseconds; and a fixed equalizer for restoring the signal transmitted by the data bit transmission lines connected to said fixed delay device having a response time substantially in the range of 1 to 3 microseconds.

2. A preset equalizing circuit as set forth in claim 1 wherein said fixed delay device produces a delay of substantially 1 microsecond.

* * * * *